United States Patent
Wang

(10) Patent No.: US 10,320,912 B2
(45) Date of Patent: Jun. 11, 2019

(54) COMMUNICATION METHOD FOR A PLURALITY OF VEHICLES, VEHICLE AND SERVER

(71) Applicant: BEIJING MOBIKE TECHNOLOGY CO., LTD., Beijing (CN)

(72) Inventor: Depi Wang, Beijing (CN)

(73) Assignee: BEIJING MOBIKE TECHNOLOGY CO., LTD., Beijing (CN)

( * ) Notice: Subject to any disclaimer, the term of this patent is extended or adjusted under 35 U.S.C. 154(b) by 36 days.

(21) Appl. No.: 15/717,600

(22) Filed: Sep. 27, 2017

(65) Prior Publication Data
US 2018/0316763 A1 Nov. 1, 2018

(30) Foreign Application Priority Data
Apr. 27, 2017 (CN) .......................... 2017 1 0288942

(51) Int. Cl.
| | |
|---|---|
| *H04L 29/08* | (2006.01) |
| *H04B 1/3822* | (2015.01) |
| *H04W 4/04* | (2009.01) |
| *G08G 1/01* | (2006.01) |
| *H04W 4/38* | (2018.01) |
| *H04W 4/90* | (2018.01) |
| *H04W 4/70* | (2018.01) |
| *H04W 4/80* | (2018.01) |
| *G08G 1/00* | (2006.01) |

(Continued)

(52) U.S. Cl.
CPC .......... *H04L 67/12* (2013.01); *G08G 1/0104* (2013.01); *G08G 1/0112* (2013.01); *H04B 1/3822* (2013.01); *H04L 67/34* (2013.01); *H04W 4/046* (2013.01); *H04W 4/38* (2018.02); *H04W 4/70* (2018.02); *H04W 4/80* (2018.02); *H04W 4/90* (2018.02); *G06F 8/65* (2013.01); *G08G 1/20* (2013.01); *H04W 84/005* (2013.01); *H04W 84/20* (2013.01)

(58) Field of Classification Search
CPC ...... H04L 67/12; H04W 84/005; H04W 84/20
USPC ........................................ 455/41.1, 41.2, 517
See application file for complete search history.

(56) References Cited

U.S. PATENT DOCUMENTS

| | | | |
|---|---|---|---|
| 2010/0148940 A1* | 6/2010 | Gelvin | H04L 67/12 340/286.02 |
| 2017/0013547 A1* | 1/2017 | Skaaksrud | H04W 4/80 |
| 2017/0372024 A1* | 12/2017 | Ikonen | H04W 84/20 |

* cited by examiner

*Primary Examiner* — Edward F Urban
*Assistant Examiner* — Ralph H Justus
(74) *Attorney, Agent, or Firm* — Alston & Bird LLP

(57) ABSTRACT

The present invention discloses A communication method for a plurality of vehicles, a vehicle and a server are disclosed. The method comprises the following steps: selecting a first vehicle from the plurality of vehicles as a master device that communicates with a server, wherein the first vehicle communicates with other vehicles among the plurality of vehicles in a first communication mode, and the master device communicates with the server in a second communication mode; and using the first vehicle as a node by which at least one of the other vehicles communicates with the server. According to an embodiment of the present invention, the problem of inability of reporting in case of a fault when any of the other vehicles directly communicates with the server is avoided. The server only needs to distribute update software to the first vehicle, rather than each vehicle one by one, and then the update software is forwarded by the first vehicle to each vehicle, thereby reducing the number of operations of the server and occupying less resources of the server.

17 Claims, 4 Drawing Sheets

(51) Int. Cl.
*G06F 8/65* (2018.01)
*H04W 84/00* (2009.01)
*H04W 84/20* (2009.01)

COMMUNICATION METHOD FOR A PLURALITY OF VEHICLES, VEHICLE AND SERVER

CROSS REFERENCE TO RELATED APPLICATIONS

This application claims priority to and the benefit of Chinese Patent Application No. 201710288942.8, filed on Apr. 27, 2017, the contents of which as are hereby incorporated by reference in their entirety.

BACKGROUND

Related Field

The present invention relates to the field of information service of vehicle systems, and in particular to a communication method for a plurality of vehicles, a vehicle and a server.

Description of Related Art

Shared bicycles refers to the provision of a sharing service of bicycles in campuses, subway stations, bus stops, residential areas, commercial areas, public service areas, etc. The user may view a distribution diagram of nearby rentable bicycles by opening a shared bicycle APP in a mobile terminal. After finding a bicycle, the user may unlock the bicycle to ride by scanning a two-dimensional code on the bicycle with the mobile terminal. Based on the same concept, there may be shared motorcycles, shared electric vehicles, shared cars and the like.

Here, the shared bicycles are taken as an example. The shared bicycles are managed by a bicycle management platform in a unified manner. The shared bicycle during riding transmits the acquired riding state information (an unlocking command, a riding distance, a riding time, electric quantity, etc.) to the bicycle management platform. When the shared bicycle cannot communicate with the bicycle management platform normally, the shared bicycle cannot transmit the riding state information to the bicycle management platform. This will lead that the bicycle management platform cannot acquire the current state of the shared bicycle in time, and then cannot manage it in time.

In addition, the shared bicycle is equipped with a module integrated with program codes. When a new version appears for the program codes, the bicycle management platform will issue update software to each shared bicycle one by one. Such an operation needs to be performed many times. In addition, such an operation occupies excessive resources of the bicycle management platform, and may even lead to the paralysis of the bicycle management platform.

Therefore, it is necessary to provide a new technical solution to improve the technical problems in the prior art.

BRIEF SUMMARY

An objective of the present invention is to provide a novel technical solution for communication of a plurality of vehicles.

According to the first aspect of the present invention, there is provided a communication method for a plurality of vehicles. The method comprises the following steps: selecting a first vehicle from the plurality of vehicles as a master device that communicates with a server, wherein the first vehicle communicates with other vehicles among the plurality of vehicles in a first communication mode, and the master device communicates with the server in a second communication mode; and using the first vehicle as a node by which at least one of the other vehicles communicates with the server.

Optionally or alternatively, the first vehicle is selected according to the communication state in which the plurality of vehicles communicates with the server.

Optionally or alternatively, the communication state between the first vehicle and the server is optimal among the plurality of vehicles.

Optionally or alternatively, after selecting the first vehicle according to the communication states in which the plurality of vehicles communicates with the server, the method further comprises: acquiring information on a battery level of the first vehicle and/or information on a distance between the first vehicle and any of the other vehicles; and determining the first vehicle as the master device that communicates with the server if the battery level of the first vehicle is greater than a preset battery level and/or the distance between the first vehicle and any of the other vehicles is smaller than a preset distance.

Optionally or alternatively, the step of using the first vehicle as the node by which at least one of the other vehicles communicates with the server comprises: receiving first data by the first vehicle from a second vehicle among the plurality of vehicles in the first communication mode; and forwarding the first data by the first vehicle to the server in the second communication mode.

Optionally or alternatively, a direct communication between the second vehicle and the server has a fault.

Optionally or alternatively, the first data includes an identifier and a fault type of the second vehicle.

Optionally or alternatively, the step of using the first vehicle as the node by which at least one of the other vehicles communicates with the server comprises: receiving second data by the first vehicle from the server in the second communication mode; and forwarding the second data by the first vehicle to at least one of the other vehicles in the first communication mode.

Optionally or alternatively, the second data includes update software.

Optionally or alternatively, the first communication mode includes at least one of a Bluetooth communication and a Near Field Communication.

Optionally or alternatively, the second communication mode includes at least one of a mobile communication a WiFi communication and a remote Bluetooth communication.

According to a second aspect of the present invention, there is provided a vehicle, comprising a first communication unit and a second communication unit, wherein the first communication unit receives first data from a second vehicle in a first communication mode, and the second communication unit forwards the first data to a server in a second communication mode.

Optionally or alternatively, a direct communication between the second vehicle and the server has a fault.

Optionally or alternatively, the first data includes an identifier and a fault type of the second vehicle.

Optionally or alternatively, the second communication unit is capable of receiving second data from the server in the second communication mode; and the first communication unit may forward the second data to at least one of the other vehicles in the first communication mode.

Optionally or alternatively, the second data includes update software.

Optionally or alternatively, the first communication mode includes at least one of a Bluetooth communication and a Near Field Communication.

Optionally or alternatively, the second communication mode includes at least one of a mobile communication, a WiFi communication and a remote Bluetooth communication.

According to the third aspect of the present invention, there is provided a server. The server comprises a selection module and a communication module. The selection module is used for selecting a first vehicle from the plurality of vehicles as a master device that communicates with a server, wherein the first vehicle communicates with other vehicles among the plurality of vehicles in a first communication mode, and the master device communicates with the server in a second communication mode. The communication module is used for using the first vehicle as a node to communication with at least one of the other vehicles.

According to the fourth aspect of the present invention, there is provided a server. The server comprises a memory and a processor, wherein the memory is used for storing instructions, the instructions being used for controlling the processor to operate to execute the method according to any of the preceding claims.

According to an embodiment, the first vehicle is selected from the plurality of vehicles as the master device that communicates with the server. The first vehicle communicates with the other vehicles among the plurality of vehicles in the first communication mode, and the master device communicates with the server in the second communication mode, therefore, the problem of inability of reporting in case of a fault when any of the other vehicles directly communicates with the server is avoided. Furthermore, by means of the above communication modes, when software set in the vehicle needs to be updated, the server only needs to distribute the update software to the first vehicle, rather than each vehicle one by one, and then the update software is forwarded by the first vehicle to each vehicle, thereby reducing the number of operations of the server, occupying less resources of the server and avoiding the problem of the paralysis of the server caused by the simultaneous interaction between all of the vehicles and the server when the software set in the vehicles is upgraded.

Other features and advantages of the present invention will become apparent from the following detailed description of exemplary embodiments of the present invention with reference to the accompanying drawings.

BRIEF DESCRIPTION OF THE FIGURES

The accompanying drawings, which are incorporated in and constitute a part of the description, illustrate the embodiments of the present invention and, together with the description thereof, serve to explain the principles of the present invention.

DETAILED DESCRIPTION OF VARIOUS EMBODIMENTS

Figure 1:
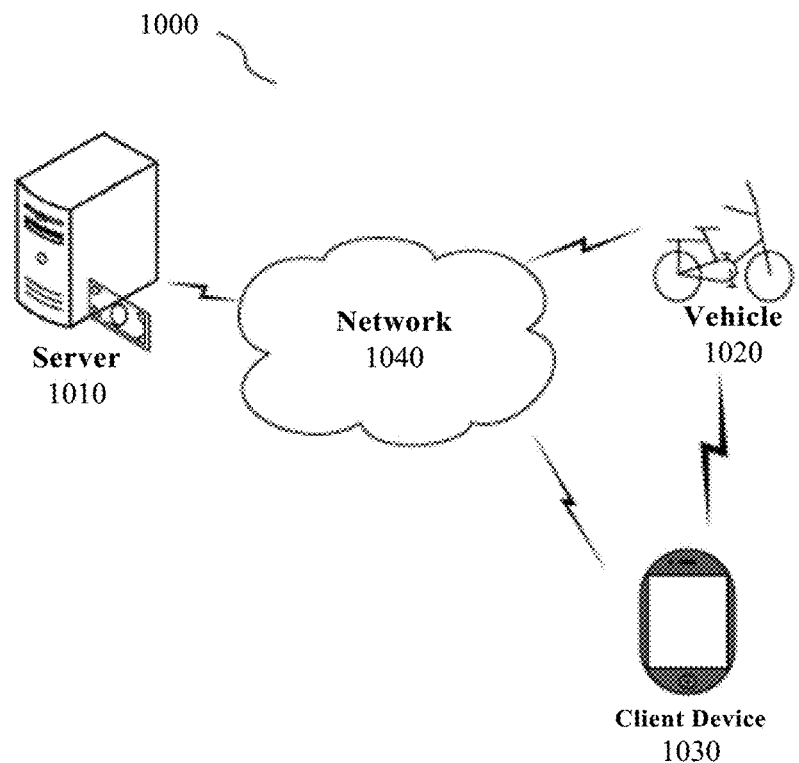
FIG. 1 illustrates a schematic block diagram of a vehicle management system according to an embodiment of the present invention.

Various exemplary embodiments of the present invention will now be described in detail with reference to the accompanying drawings. It should be noted that the relative arrangement, numerical expressions and numerical values of the components and steps set forth in these embodiments do not limit the scope of the present invention unless otherwise specified.

The following description of at least one exemplary embodiment is in fact merely illustrative and is in no way intended as a limitation to the present invention and its application or use.

Techniques, methods, and devices known to those of ordinary skill in the relevant art may not be discussed in detail but where appropriate, the techniques, methods, and devices should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, there is no need for further discussion in the accompanying drawings. Hereinafter, various embodiments and examples according to the present invention will be described with reference to the accompanying drawings.

FIG. 1 is a schematic block diagram of a vehicle management system according to an embodiment of the present invention.

As shown in FIG. 1, the vehicle management system 1000 includes a server 1010, a vehicle 1020, and a client device 1030. For example, the vehicle 1020 and the client device 1030 may communicate with the server 1010 via a network 1040. The vehicle 1020 and the client device 1030 may communicate in such manners as Bluetooth communication or Near Field Communication. For example, the client device 1030 may be installed in a terminal device such as a handset, or may be a separate device.

The vehicle 1020 has a two-dimensional code and/or a code for uniquely identifying the corresponding vehicle.

The user may scan a two-dimensional code on the vehicle 1020 via the client terminal 1030 and further transmit the two-dimensional code information to the server 1010 to perform an unlocking operation.

The user may also input or identify the code on the vehicle 1020 via the client terminal 1030 and further transmit the code information to the server 1010 to perform an unlocking operation.

When the user scans the two-dimensional code or inputs the code on the vehicle 1020 via the client device 1030, it is necessary to use the functions of the client device 1030, such as a flashlight function, a camera function and the like of the client device 1030.

In the present invention, the client device 1030 may transmit or receive a signal by way of a wired or wireless network, or may process or store the signal as a physical storage state, for example, in a memory. Each client device may be an electronic device that includes hardware, software or embedded logic components or a combination of two or more such components and is capable of performing appropriate functions implemented or supported by the mobile terminal. For example, the client device may be a smart phone, a tablet computer, a portable e-mail device, an electronic book, a handheld game machine and/or a game controller, a notebook computer, a netbook, a handheld electronic device, an intelligent wearable device, and the like. The present invention encompasses any appropriate client device. The client device may allow the user who uses the client device to access the network.

The client device 1030 may comprise a processing device including an application processing unit and a radio frequency/digital signal processor, and may also comprise ROM, RAM, a flash memory, or any combination thereof.

In addition, various client applications may be installed on the client device 1030, wherein the client applications may be used to allow the use of the client device 1030 to transmit commands suitable for operation with other devices. Such applications may be downloaded from the server and installed in the memory of the client device 1030, or may have been installed on the client device 1030 in advance. In the present invention, the client device 1030 is provided with a vehicle user terminal application which may assist the user in realizing the function of using the vehicle 1020.

The term "server" as used herein should be construed as a service point for providing processing, databases and communication facilities. For example, a server may refer to a single physical processor with associated communication and data storage and database facilities, or a collection of a networked or aggregated processor, an associated network and a storage device, and operate software, one or more database systems and application software supporting services provided by the server. The server may vary greatly in configuration or performance. But the server may generally include one or more central processing units and a memory. The server further includes one or more mass storage devices, one or more power supplies, one or more wired or wireless network interfaces, one or more input/output interfaces, or one or more operating systems, such as Windows Server, Mac OS X, Unix, Linux, FreeBSD, and so on. Concretely, the server 1010 may be a monolithic server or a distributed server across multiple computers or computer data centers. The server may be of various types, such as, but not limited to, a web server, a news server, a mail server, a message server, an ad server, a file server, an application server, an interactive server, a database server, or a proxy server. In certain embodiments, each server may include hardware, software, or embedded logic components for performing appropriate functions supported or implemented by the server or a combination of two or more such components. In the present invention, the server 1010 is used to provide all the functions necessary to support the use of the vehicle.

In the present invention, the vehicle 1020 may be of various types, such as a bicycle, a tricycle, an electric moped, a motorcycle, and a four-wheeled passenger vehicle.

In the present invention, the wireless network 1040 covers any suitable wireless network, such as, but not limited to, a 4G network, a 3G network, GPRS, Wi-Fi, and so on. In addition, the wireless network that couples the server 1010 and the client device 1030 together with the wireless network that couples the server 1010 and the vehicle 1020 may be the same wireless network or different wireless networks.

<Method>

Figure 2:
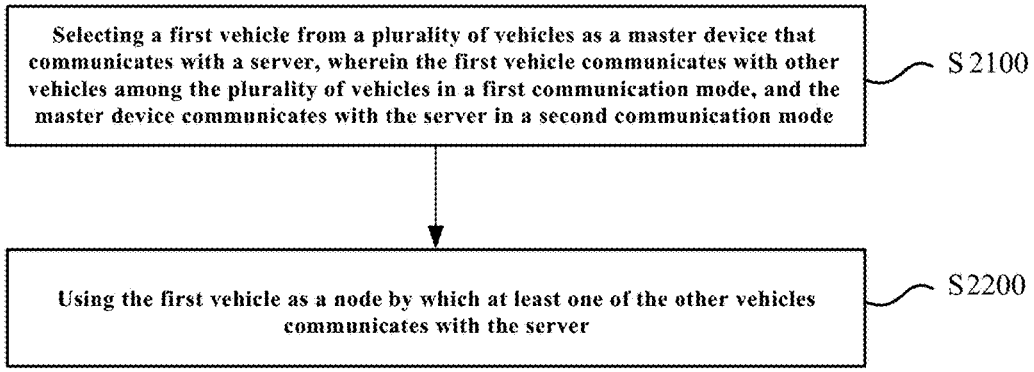
FIG. 2 illustrates a schematic flow diagram of a communication method for a plurality of vehicles according to an embodiment of the present invention.

FIG. 2 illustrates a schematic flow diagram of a communication method for a plurality of vehicles according to an embodiment of the present invention.

As shown in FIG. 2, in step S2100, a first vehicle is selected from a plurality of vehicles as a master device that communicates with a server, wherein the first vehicle communicates with other vehicles among the plurality of vehicles in a first communication mode, and the master device communicates with the server in a second communication mode.

In an embodiment, each vehicle is provided with two communication units, i.e., a first communication unit and a second communication unit. The first communication unit performs communication adopting a first communication mode, and the second communication unit performs communication adopting a second communication mode. The first communication mode includes one of a Bluetooth communication and a Near Field Communication, wherein the Bluetooth communication here is a short-range Bluetooth communication. The second communication mode includes at least one of a mobile communication, a WiFi communication and a remote Bluetooth communication. In the embodiment of the present invention, the short-range Bluetooth communication and the remote Bluetooth communication are relatively speaking, and generally a communication distance of the short-range Bluetooth communication is 10 m or less and a communication distance of the remote Bluetooth communication is 100 m or less. But the communication distance is merely an example and is not to be construed as limiting the present invention. The mobile communication mode refers to the communication mode provided by a telecom operator, for example, communication performed via 3G, 4G, 5G networks, and, for example, communication performed via the NB-IoT (Narrow Band Internet of Things).

In an embodiment, the selection of a vehicle from a plurality of vehicles as a master device that communicates with a server is based on communication states in which the plurality of vehicles communicates with the server. The communication mode of the plurality of vehicles and the server involved here is the second communication mode.

In an example, each vehicle may communicate with the server in the second communication mode. Taking a shared bicycle as an example, an unlocking command transmitted by a user to a server via a mobile terminal, riding state information obtained by the bicycle during the riding of the user, and vehicle-locking state information after the user has finished riding are all transmitted to the server in the second communication mode. The vehicle having the optimal communication state is selected as a first vehicle based on the communication state in which each vehicle communicates with the server in the second communication mode. It should be understood by those skilled in the art that, although the bicycle is used herein as an example, the vehicle in the following examples and embodiments is not limited to a bicycle, and may include a motorcycle, an electric vehicle, a car or the like. Taking the bicycle as an example, each bicycle comprises two communication units, i.e., a Bluetooth communication unit and a WIFI communication unit. Each bicycle may communicate with the server via the WIFI communication unit. A plurality of bicycles may establish a bicycle Ad-Hoc network through the Bluetooth communication unit, and within a coverage range of the bicycle Ad-Hoc network, the plurality of bicycles may communicate with each other. Each bicycle transmits a data packet to the server via the WIFI communication unit. The server determines the communication state between each bicycle and the server through receiving reception state information of the received data packet transmitted by each bicycle, then selects the bicycle with the optimal communication state according to the communication state between each bicycle and the server and takes the bicycle among the plurality of bicycles within the Ad-Hoc network as a master device that communicates with the server.

In an example, after the vehicle having an optimal communication state is selected as a first vehicle according to the communication state in which each vehicle communicates with the server in a second communication mode, it is also necessary to determine the state information of the first vehicle. The state information of the first vehicle at least includes one of information on a battery level of the first vehicle and information on a distance between the first vehicle and any of the other vehicles. First, the information on the battery level of the first vehicle and/or the information on the distance between the first vehicle and any of the other vehicles are/is acquired. Then, the information on the battery level of the first vehicle and/or the information on the distance between the first vehicle and any of the other vehicles are/is determined. The first vehicle is determined as the master device that communicates with the server if the battery level of the first vehicle is greater than a preset battery level and/or the distance between the first vehicle and any of the other vehicles is smaller than a preset distance. The preset battery level involved in the embodiment of the present invention may be set as 50% or 40% or 30% of the saturated battery level, which is not limited in the present invention. The preset distance involved in the embodiment of the present invention may be set to 5 m or 10 m, which is not limited in the present invention.

The determination of the battery level of the first vehicle avoids the problem of a communication fault between the first vehicle and the server owing to an insufficient capacity of the selected first vehicle. In addition, the first communication mode of the first vehicle and any of the other vehicles is a short-range communication mode, and the communication state of the first vehicle and any of the other vehicles is related to the distance between the first vehicle and any of the other vehicles. In order to ensure that the communication state of the first vehicle and any of the other vehicles is good, the distance between the selected first vehicle and any of the other vehicles must be smaller than the preset distance.

In an example, if the communication state of the selected first vehicle and the server is optimal, but the battery level of the first vehicle is smaller than the preset battery level, and/or the distance between the first vehicle and at least one of the other vehicles is greater than the preset distance, it is necessary to reselect one vehicle form the plurality of vehicles as a master device that communicates with the server. For example, a vehicle of which a communication state with the server side is the second-optimal communication state is temporarily selected as a first vehicle according to the communication state of each vehicle and the server side as determined by the server side. Meanwhile, it is also necessary to determine information on a battery level of the first vehicle and/or information on a distance between the first vehicle and any of the other vehicles.

In step S2200, the first vehicle is used as a node by which at least one of the other vehicles communicates with the server.

The first vehicle may not only forward received data from any of the other vehicles to the server, but also forward the received data from the server to each or part of the other vehicles.

In an embodiment, the first vehicle receives first data from a second vehicle among the plurality of vehicles in a first communication mode, and then forwards the first data to the server in the second communication mode. Concretely, an Ad-Hoc network is established among the plurality of vehicles in the first communication mode, and the vehicles within the Ad-Hoc network may communicate with each other. When a direct communication between any of the plurality of vehicles and the server has a fault, the vehicle cannot forward the first data with fault information to the server directly, the vehicle at this moment may transmit the first data to the first vehicle in the first communication mode, and then the first vehicle forwards the received first data to the server in the second communication mode. The first data includes an identifier and a fault type of the second vehicle.

In an embodiment, the first vehicle receives the second data from the server in the second communication mode and then forwards the second data to at least one of the other vehicles in the first communication mode. The second data includes update software. Concretely, the vehicle is provided with a module with program codes. When a new version occurs to the program codes, it is necessary to update the program codes. The server at this moment may transmit the second data with the program codes of the new version to the first vehicle in the second communication mode. The first vehicle forwards the received second data to the other vehicles or part of the other vehicles in the first communication mode. The first vehicle may perform updating using the received second data from the server, and the other vehicles or part of the other vehicles may perform updating using the received second data forwarded by the first vehicle.

According to an embodiment, the first vehicle is selected from the plurality of vehicles as the master device that communicates with the server. The first vehicle communicates with the other vehicles among the plurality of vehicles in the first communication mode, and the master device communicates with the server in the second communication mode. Therefore, the problem of inability of reporting in case of a fault when any of the other vehicles directly communicates with the server is avoided. Furthermore, by means of the above communication modes, when software set in the vehicle needs to be updated, the server only needs to distribute the update software to the first vehicle, rather than each vehicle one by one, and then the update software is forwarded by the first vehicle to each vehicle, thereby reducing the number of operations of the server, occupying less resources of the server and avoiding the problem of the paralysis of the server caused by the simultaneous interaction between all of the vehicles and the server when the software set in the vehicle is upgraded.

<Device>

It should be understood by those skilled in the art that in the field of electronic technologies, the above method may be embodied in a product by way of software, hardware, and a combination of software and hardware. It will be readily apparent to those skilled in the art that a vehicle is generated based on the method disclosed above. The vehicle comprises a first communication unit and a second communication unit. The first communication unit communicates with the second vehicle in a first communication mode. The second communication unit communicates with a server in a second communication mode. The first communication mode includes one of a Bluetooth communication and a Near Field Communication, wherein the Bluetooth communication here is a short-range Bluetooth communication. The second communication mode includes at least one of a mobile communication, a WiFi communication and a remote Bluetooth communication. The mobile communication refers to the communication provided by a telecom operator, for example, communication performed via 3G, 4G, 5G networks, and, for example, communication performed via the NB-IoT (Narrow Band Internet of Things).

In an embodiment, the first communication unit receives first data from a second vehicle in the first communication mode, and the second communication unit forwards the first data to the server in the second communication mode. The first data includes an identifier and a fault type of the second vehicle. Concretely, an Ad-Hoc network is established among the plurality of vehicles in the first communication mode, and the vehicles within the Ad-Hoc network may communicate with each other. A first vehicle is selected from the plurality of vehicles within the Ad-Hoc network as a master device that communicates with the server and communicates with the server in the second communication mode. When a direct communication between the second vehicle and the server has a fault, the second vehicle cannot forward the first data with fault information to the server directly, the second vehicle at this moment may transmit the first data to the first vehicle in the first communication mode, and then the first vehicle forwards the received first data to the server.

In an embodiment, the first vehicle is selected from the plurality of vehicles within the Ad-Hoc network as a master device that communicates with the server, according to the communication state in which each vehicle within the Ad-Hoc network communicates with the server in the second communication mode. Concretely, the vehicle with the optimal communication state is selected as the first vehicle.

In an embodiment, after the vehicle with an optimal communication state is selected as the first vehicle, it is necessary to determine state information of the first vehicle. The state information of the first vehicle at least includes one of information on a battery level of the first vehicle and information on a distance between the first vehicle and any of the other vehicles. First, the first vehicle transmits the information on the battery level of the first vehicle and/or the information on the distance between the first vehicle and any of the other vehicles to the server side. Then, the server side determines the information on the battery level of the first vehicle and/or the information on the distance between the first vehicle and any of the other vehicles. The first vehicle is determined as the master device that communicates with the server if the battery level of the first vehicle is greater than a preset battery level and/or the distance between the first vehicle and any of the other vehicles is smaller than a preset distance. The preset battery level involved in the embodiment of the present invention may be set as 50% or 40% or 30% of the saturated battery level, which is not limited in the present invention. The preset distance involved in the embodiment of the present invention may be set to 5 m or 10 m, which is not limited in the present invention.

The determination of the battery level of the first vehicle avoids the problem of a communication fault between the first vehicle and the server owing to an insufficient capacity of the selected first vehicle. In addition, the first communication mode of the first vehicle and any of the other vehicles is a short-range communication mode, and the communication state of the first vehicle and any of the other vehicles is related to the distance between the first vehicle and any of the other vehicles. In order to ensure that the communication state of the first vehicle and any of the other vehicles is good, the distance between the selected first vehicle and any of the other vehicles must be smaller than the preset distance.

In an example, if the communication state of the selected first vehicle and the server is optimal, but the battery level of the first vehicle is smaller than the preset battery level, and/or the distance between the first vehicle and at least one of the other vehicles is greater than the preset distance, it is necessary to reselect one vehicle form the plurality of vehicles as a master device that communicates with the server. For example, a vehicle of which a communication state with the server side is the second-optimal communication state is temporarily selected as a first vehicle according to the communication state of each vehicle with the server side determined by the server side. Meanwhile, it is also necessary to determine information on a battery level of the first vehicle and/or information on a distance between the first vehicle and any of the other vehicles.

In an embodiment, the first vehicle receives the second data from the server in the second communication mode and then forwards the second data to at least one of the other vehicles in the first communication mode. The second data includes update software. Concretely, the vehicle is provided with a module with program codes. When a new version occurs to the program codes have a new version, it is necessary to update the program codes. The server at this moment may transmit the second data with the program codes of the new version to the first vehicle in the second communication mode. The first vehicle forwards the received second first data to the other vehicles or a part of the other vehicles in the first communication mode. The first vehicle may perform updating using the received second data from the server, and the other vehicles or a part of the other vehicles may perform updating using the received second data forwarded by the first vehicle.

Figure 3:
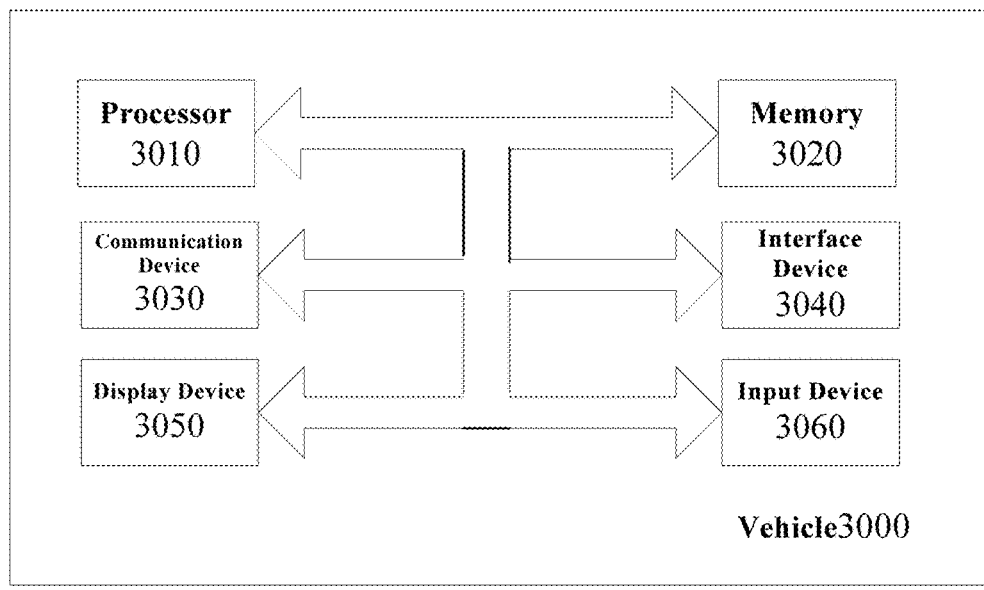
FIG. 3 illustrates a schematic block diagram of a hardware structure of a vehicle according to an embodiment of the present invention.

FIG. 3 illustrates a schematic block diagram of a hardware structure of a vehicle according to an embodiment of the present invention. Referring to FIG. 3, the vehicle 3000 may include a processor 3010, a memory 3020, a communication device 3030, an interface device 3040, a display device 3050, an input device 3060, and the like.

The processor 3010 may be a central processing unit CPU, a micro-processing unit MPU, or the like.

The memory 3020 includes, for example, a ROM (Read Only Memory), a RAM (Random Access Memory), a non-volatile memory such as a hard disk, and the like.

The communication device 3030 is, for example, available for wired or wireless communication.

The interface device 3040 includes, for example, a USB interface, a headphone interface, and the like.

The display device 3050 is, for example, a liquid crystal display, a touch screen, and the like.

The input device 3060 may include, for example, a touch screen, a keyboard, and the like.

The hardware structure of the vehicle shown in FIG. 3 is merely illustrative and is in no way intended to limit the present invention and its application or use.

In this embodiment, the memory 3020 is used for storing executable instructions. The processor 3010 is used for executing the following method via the communication device 3030 according to the control of the instructions: receiving first data from a second vehicle in a first communication mode and forwarding the first data to a server in a second communication mode. The processor 3010 is used for executing the following methods: receiving the second data from the server in the second communication mode and forwarding the second data to the second vehicle in the first communication mode, via the communication device 3030 according to the control of the instructions.

It should be understood by those skilled in the art that, although a plurality of devices is illustrated in FIG. 3, the present invention may relate only to a portion of the devices, for example, the processor 3010, the memory 3020 and the communication device 3030. Those skilled in the art may design instructions in accordance with the solution disclosed by the present invention. How to control the processor to perform operations through the instructions is well-known in the art, which is therefore not described in detail herein.

<Server>

Figure 4:
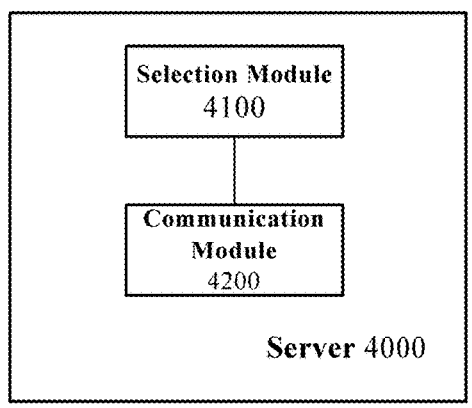
FIG. 4 illustrates a schematic block diagram of a server according to an embodiment of the present invention.

It should be understood by those skilled in the art that in the field of electronic technologies, the above method may be embodied in a product by way of software, hardware, and a combination of software and hardware. It will be readily apparent to those skilled in the art that a server is generated based on the method disclosed above. The server may include apparatuses for implementing the various operations in the communication method for the plurality of vehicles as described above. FIG. 4 illustrates a schematic block diagram of a server according to an embodiment of the present invention. Referring to FIG. 4, the server 4000 comprises a selection module 4100 and a communication module 4200. The selection module 4100 is used for selecting a first vehicle from a plurality of vehicles as a master device that communicates with a server, wherein the first vehicle communicates with other vehicles among the plurality of vehicles in a first communication mode, and the master device communicates with the server in a second communication mode. The communication module 4200 is used for allowing the first vehicle as a node to communicate with at least one of the other vehicles.

Figure 5:
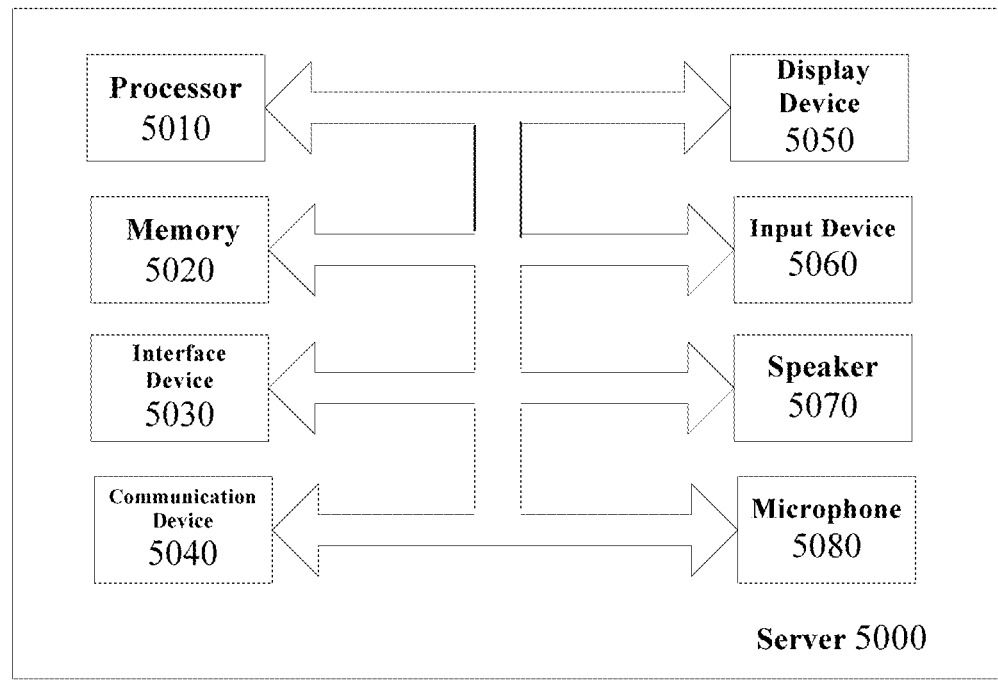
FIG. 5 illustrates another schematic block diagram of a server according to an embodiment of the present invention.

FIG. 5 illustrates another schematic block diagram of a server according to an embodiment of the present invention.

As shown in FIG. 5, the server 5000 comprises a processor 5010, a memory 5020, an interface device 5030, a communication device 5040, a display device 5050, an input device 5060, a speaker 5070, a microphone 5080, and the like.

The processor 5010 may be a central processing unit CPU, a micro-processing unit MPU, or the like.

The memory 5020 includes, for example, a ROM (Read Only Memory), a RAM (Random Access Memory), a non-volatile memory such as a hard disk, and the like.

The interface device 5030 includes, for example, a USB interface, a headphone interface, and the like.

The communication device 5040 is, for example, available for wired or wireless communication.

The display device 5050 is, for example, a liquid crystal display, a touch screen, and the like.

The input device 5060 may include, for example, a touch screen, a keyboard, and the like.

The user may input/output voice messages via the speaker 5070 and the microphone 5080.

The electronic device shown in FIG. 5 is merely illustrative and is in no way intended to limit the present invention and its application or use.

In this embodiment, the memory 5020 is used for storing executable instructions. When the server operates, the executable instructions are used for controlling the processor 5010 to operate to execute various operations of the communication method for the plurality of vehicles in various embodiments described above. For example, the executable instructions are used for controlling the processor 5010 to perform the following operations: selecting a first vehicle from the plurality of vehicles as a master device that communicates with a server, wherein the first vehicle communicates with other vehicles among the plurality of vehicles in a first communication mode, and the master device communicates with the server in a second communication mode; and using the first vehicle as a node by which at least one of the other vehicles communicates with the server.

It will be understood by those skilled in the art that although a plurality of apparatuses are shown in FIG. 5, the invention may relate only to a part of the apparatuses, for example, the processor 5010 and the memory 5020. Those skilled in the art may design instructions in accordance with the solution disclosed by the present invention. How to control the processor to perform operations through the instructions is well-known in the art, which is therefore not described in detail herein.

Examples

The examples according to the above-described embodiments will be described with reference to FIGS. 6 and 7.

Figure 6:
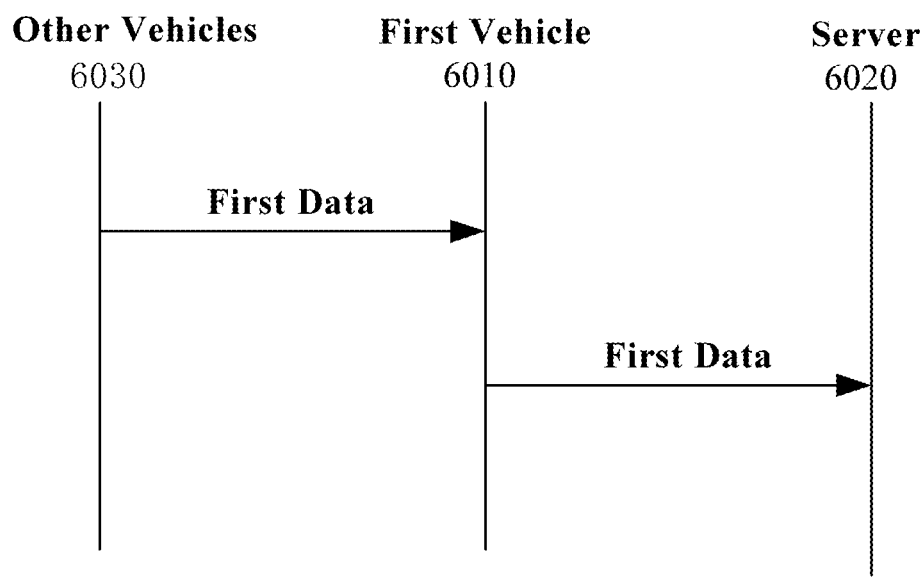
FIG. 6 illustrates another schematic flow diagram of a communication method for a plurality of vehicles according to an embodiment of the present invention.
Figure 7:
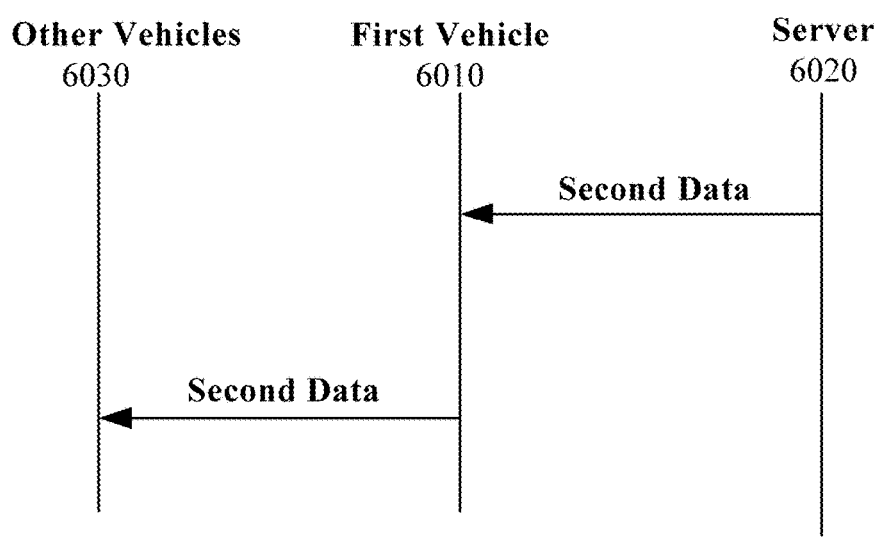
FIG. 7 illustrates yet another schematic flow diagram of a communication method for a plurality of vehicles according to an embodiment of the present invention.

Referring to FIGS. 6 and 7, the first vehicle 6010 is selected from the plurality of vehicles as a master device that communicates with the server 6020. The first vehicle 6010 communicates with other vehicles 6030 in the first communication mode, wherein the first communication mode includes one of a Bluetooth communication and a Near Field Communication, and the Bluetooth communication here is a short-range Bluetooth communication. The first vehicle 6010 communicates with the server 6020 in the second communication mode, wherein the second communication mode includes at least one of a mobile communication, a WiFi communication and a remote Bluetooth communication.

When a direct communication between one or more of the other vehicles 6030 and the server 6020 has a fault, one or more vehicles among the other vehicles 6030 cannot transmit the first data with fault information to the server 6020 directly. Referring to FIG. 6, first, one or more of the other vehicles 6030 may transmit the first data to the first vehicle 6010 in the first communication mode, and then the first vehicle 6010 forwards the received first data to the server 6020.

Each vehicle is provided with a module with program codes. When a new version occurs to the program codes, it is necessary to update the program codes. Referring to FIG. 7, the server 6020 may transmit the second data with the program codes of the new version to the first vehicle 6010 in the second communication mode, and the first vehicle 6010 then forwards the received second data to the other vehicles 6030 in the first communication mode. The first vehicle 6010 and the other vehicles 6030 may perform updating using the second data, and therefore the problem of the paralysis of the server caused by the simultaneous interaction between all of the vehicles and the server when the software set in the vehicles is upgraded is avoided.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent with each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The scope of the present invention is defined by the attached claims.

The invention claimed is:

1. A communication method for a plurality of nodes each associated with a vehicle, said method comprising the following steps:
selecting a first node from the plurality of nodes as a master device that communicates with a server, wherein the first node communicates with other nodes among the plurality of nodes in a first communication mode, and wherein the master device communicates with the server in a second communication mode; and
using the first node for at least one of the other nodes to communicate with the server,
wherein:
the first node is selected according to the communication states in which the plurality of nodes communicates with the server,
the communication state between the first node and the server is optimal among the plurality of nodes, and
after the step of selecting the first node as the master device:
acquiring information on a distance between the first node and any of the other nodes;
when the distance between the first node and any of the other nodes is smaller than a preset distance, maintaining the first node as the master device that communicates with the server, and
when the communication state of the selected first node and the server is optimal but the distance between the first node and at least one of the other nodes is greater than the preset distance, reselecting a node other than the first node from the plurality of nodes as the master device.

2. The method according to claim 1, wherein after the step of selecting the first node, the method further comprises the following steps:
acquiring information on a battery level of the first node;
when the battery level of the first node is greater than a preset battery level, maintaining the first node as the master node, and
when the communication state between the first node and the server is optimal but the battery level of the first node is less than the preset battery level, reselecting a node other than the first node from the plurality of nodes as the master device.

3. The method according to claim 1, wherein the step of using the first node for the at least one of the other vehicles to communicate with the server comprises:
receiving first data, by the first node, from a second node among the plurality of nodes in the first communication mode; and
forwarding the first data, by the first node, to the server in the second communication mode.

4. The method according to claim 3, wherein a direct communication between the second node and the server has a fault.

5. The method according to claim 4, wherein the first data includes an identifier and a fault type of the second node.

6. The method according to claim 1, wherein the step of using the first node for the at least one of the other vehicles to communicate with the server comprises:
receiving second data, by the first node, from the server in the second communication mode; and
forwarding the second data, by the first node, to at least one of the other nodes in the first communication mode.

7. The method according to claim 6, wherein the second data includes update software.

8. The method according to claim 1, wherein the first communication mode includes at least one of a Bluetooth communication or a Near Field Communication.

9. The method according to claim 1, wherein the second communication mode includes at least one of a mobile communication, a WiFi communication or a remote Bluetooth communication.

10. A server, comprising a memory and a processor, wherein the memory is used for storing instructions, the instructions being used for controlling the processor to operate to execute the method according to claim 1.

11. A vehicle with a node associated with the vehicle, the vehicle comprising:
memory and a processor, the memory storing instructions, the instructions being configured for controlling the processor to execute the method according to claim 1;
a first communication unit; and
a second communication unit,
wherein:
the first communication unit receives first data from a second node in the first communication mode, and
the second communication unit forwards the first data to a server in the second communication mode.

12. The vehicle according to claim 11, wherein direct communication between the second node and the server has a fault.

13. The vehicle according to claim 11, wherein the first data includes an identifier and a fault type of the second node.

14. The vehicle according claim 11, wherein:
the second communication unit is configured for receiving second data from the server in the second communication mode; and
the first communication unit is configured for forwarding the second data to at least one of the other nodes in the first communication mode.

15. The vehicle according to claim 14, wherein the second data includes update software.

16. The vehicle according to claim 11, wherein the first communication mode includes at least one of a Bluetooth communication or a Near Field Communication.

17. The vehicle according to claim 11, wherein the second communication mode includes at least one of a mobile communication, a WiFi communication or a remote Bluetooth communication.

* * * * *